United States Patent [19]

Cenzano, Jr. et al.

[11] Patent Number: 4,912,461
[45] Date of Patent: Mar. 27, 1990

[54] APPARATUS AND NETWORK FOR TRANSFERRING PACKETS OF ELECTRONIC SIGNALS AND ASSOCIATED METHOD

[75] Inventors: Otto M. Cenzano, Jr.; Garry L. Pitt, both of Woodland Hills, Calif.

[73] Assignee: Cellular Control Systems Corporation, Woodland Hills, Calif.

[21] Appl. No.: 163,209

[22] Filed: Feb. 26, 1988

Related U.S. Application Data

[63] Continuation of Ser. No. 927,339, Nov. 5, 1986, abandoned.

[51] Int. Cl.4 .......................... H04Q 3/04; H04Q 3/58; H04Q 7/00
[52] U.S. Cl. .......................... 340/825.520; 340/310 R; 340/310 A; 340/825.690
[58] Field of Search .......................... 340/825.52, 825.69, 340/825.49, 825.02, 310 R, 310 A, 539, 425, 531; 379/221; 370/58, 26; 455/11, 41, 55, 56, 15

[56] References Cited

U.S. PATENT DOCUMENTS

| | | | |
|---|---|---|---|
| 3,316,354 | 4/1967 | Svala | 379/221 |
| 3,337,992 | 8/1967 | Tolson | 340/539 |
| 3,426,278 | 2/1969 | Van Der Valk . | |
| 3,487,310 | 12/1969 | Bateman et al. | 455/15 X |
| 3,916,311 | 10/1975 | Martin et al. . | |
| 4,015,548 | 4/1977 | Schuss . | |
| 4,125,808 | 11/1978 | Graham . | |
| 4,190,821 | 2/1980 | Woodward | 340/825.01 |
| 4,228,496 | 10/1980 | Katzman et al. | 364/200 |
| 4,276,643 | 6/1981 | Laprie et al. | 371/8 |
| 4,308,613 | 12/1981 | Chasek | 370/94 |
| 4,399,531 | 8/1983 | Grande | 340/825.02 |
| 4,400,694 | 8/1983 | Wong et al. | 340/825.06 |
| 4,427,968 | 1/1984 | York | 455/15 X |
| 4,490,818 | 12/1984 | Otsuka | 370/26 |
| 4,509,039 | 4/1985 | Dowdle . | |
| 4,516,272 | 5/1985 | Yano | 370/58 |
| 4,527,270 | 7/1985 | Sweeton | 371/11 |
| 4,539,706 | 9/1985 | Mears et al. | 455/54 |
| 4,542,479 | 9/1985 | Kamimura et al. | 364/900 |
| 4,543,651 | 9/1985 | Shi-Jeh Chang | 370/16 |
| 4,545,049 | 10/1985 | Kammerer et al. | 370/16 |
| 4,553,233 | 11/1985 | Debuysscher et al. | 370/16 |
| 4,589,075 | 5/1986 | Buennagel | 340/825.69 |
| 4,611,198 | 9/1986 | Levinson et al. | 340/539 |
| 4,638,298 | 1/1987 | Spiro | 340/310 A |
| 4,644,321 | 2/1987 | Kennon | 340/310 A |
| 4,649,385 | 3/1987 | Aires et al. | 340/825.49 |
| 4,658,357 | 4/1987 | Carroll et al. | 340/539 |
| 4,679,189 | 7/1987 | Olson et al. | 370/94 |

FOREIGN PATENT DOCUMENTS 0236539  11/1985  Japan .............................. 340/825.69

OTHER PUBLICATIONS

M. M. Mano, "Computer System Architecture", Prentice-Hall, Inc., N.J., 1982, pp. 137, 264–266.

*Primary Examiner*—Ulysses Weldon
*Attorney, Agent, or Firm*—Blakely, Sokoloff, Taylor & Zafman

[57] ABSTRACT

An apparatus is provided for receiving at least one respective packet of signals from a node included in a collection of nodes and for providing at least one respective packet of signals to another node included in the collection, wherein the respective received and provided packets of signals include respective routing signals for respectively routing the respective received and provided packets among the nodes in the collection, said apparatus comprising: first means for receiving first signals modulated with respective packets of signals, the respective received packets including respective routing signals; second means for modifying respective routing signals included in at least one of the respective received packets and for providing at least one respective modified packet of signals including the respective modified routing signals; third means for providing second signals modulated with the at least one respective modified packet of signals; and fourth means for capturing the first signals, for providing the first signals to said first means and for propagating the second signals provided by said third means over a relatively short prescribed distance.

49 Claims, 5 Drawing Sheets

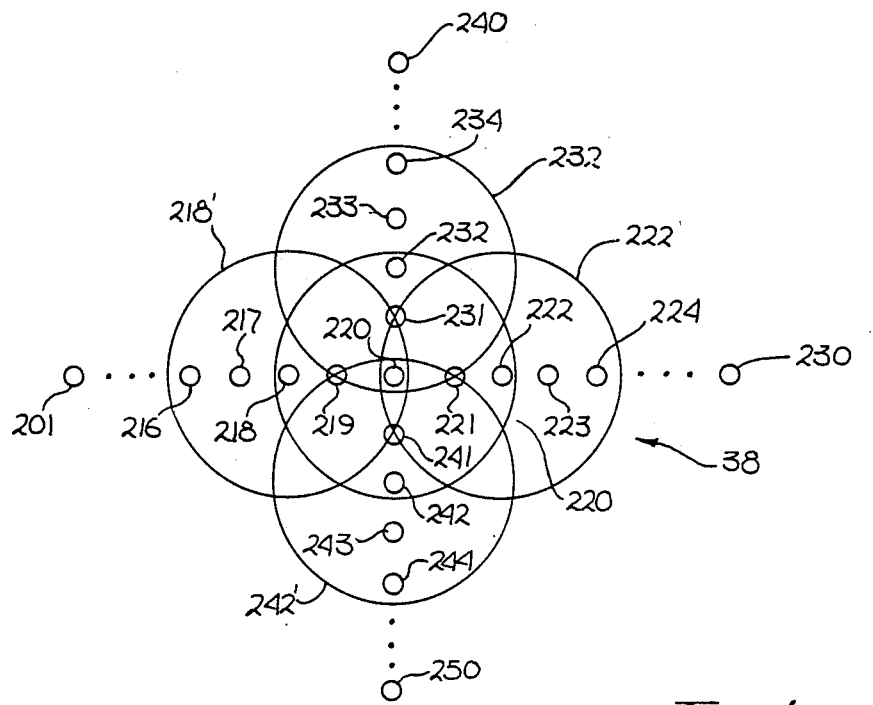
_Fig. 1_
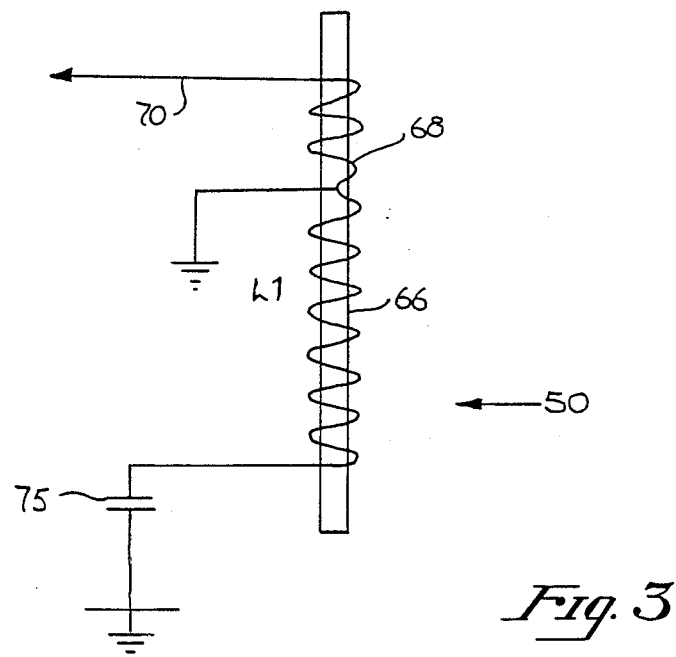
_Fig. 3_

| FINAL DESTINATION | LINK MAP NUMBER |
|---|---|
| 2d-218 | 1 |
| 222-230 | 2 |
| 232-240 | 3 |
| 242-250 | 4 |
| 219 | 5 |
| 221 | 6 |
| 231 | 9 |
| 241 | 8 |
| 201-218 | 5 |
| 222-230 | 6 |
| 232-240 | 7 |
| 242-250 | 8 |

APPARATUS AND NETWORK FOR TRANSFERRING PACKETS OF ELECTRONIC SIGNALS AND ASSOCIATED METHOD

This is a continuation of application Ser. No. 9,27,339, filed Nov. 5, 1986, now abandoned.

BACKGROUND OF THE INVENTION

1. Field of the Invention

The present invention relates generally to an apparatus and a related network for communicating packets of electronic signals among a collection of nodes, and more particularly, to an apparatus and a related network for routing respective packets of electronic signals to respective nodes in a collection.

2. Description of the Related Art

There has been an increasing use of local area networks to provide centralized management and control over related functions performed at spatially dispersed locations. Typical earlier local area networks comprised collections of nodes and means for coupling the nodes in the collection to one another so that packets of information-carrying electronic signals could be routed among the nodes. The respective packets ordinarily included routing signals used by the respective nodes to identify which node was the destination or target for respective individual packets. Thus, respective packets of information carrying signals typically were transferred from node to node in the network until they reached their respective destination nodes.

One well known technique for guiding a respective packet of signals among the nodes of a local area network involves including routing signals in the packet which identify the destination node for the respective packet. Briefly stated, as the respective packet is transferred from node to node, each node examines the identifying routing signals in order to ascertain whether that node is the destination for the respective packet. If it is, then it processes the packet of signals. If it is not, then it transfers the packet to another node in the network. Although sometimes nodes are included in a network which select between two or more other nodes as the next node for receiving the respective packet, the selection ordinarily is made based upon a predetermined routing path to be followed by a respective packet in reaching its destination node, and that routing path typically is not easily modified.

While prior local area networks generally have been successful, there have been shortcomings with their use. For example, in constructing a local area network, it is important to couple respective nodes of the network so that respective packets can be transferred among the nodes. In the past, such coupling usually involved connecting conductor wires between respective nodes of the network which were to transfer packets between one another. However, the spatial layout of the nodes within the network sometimes could be complex, and when the network was to be installed in a preexisting structure such as a hotel building or a factory, the wiring together of respective nodes could result in significant disruption and expense. Furthermore, there often was a possibility that one or more nodes within the network might fail or that there might be a need to change the predetermined routing path in order to add new nodes or to delete unwanted nodes. Unfortunately, such changes to hard wired networks could be difficult and expensive to accomplish.

One alternative approach to providing centralized management and control over related functions performed at spatially dispersed locations involves the provision of radio frequency signals modulated by respective information carrying packets of signals. The respective modulating packets include identifying signals used to identify the respective destination nodes for the respective packets. Instead of transferring respective packets in a stepwise node to node fashion, packets are broadcast directly to their respective destination nodes. While using this alternative approach ordinarily does not require that individual nodes be wired together, and therefore, can lead to easier installation of networks in complex layouts and in preexisting structures, there have been problems with its use. These problems result from the possibility of simultaneous broadcasts of radio frequency signals by different nodes which can result in interference between the simultaneously broadcasted signals. The potential interference problems attendant with simultaneous broadcasts can necessitate that transmission of packets by nodes be restricted so as to not result in simultaneous broadcasts. However, restricting nodes so as to broadcast only when they will not interfere with broadcasts by other nodes can reduce the volume of packets which can be provided using radio frequency signals.

Furthermore, often there are stringent licensing requirements governing the use of certain radio frequency signals. Thus, the use of radio frequency signals to couple a network of dispersed nodes can require potentially time consuming efforts to obtain appropriate licenses to use signals of a particular frequency.

Thus, there has existed a need for an apparatus and a related local area network which can be easily and economically installed even in an environment involving a complex layout of a network of nodes in preexisting structures, which can be used to route packets of information carrying signals in a flexible manner so that routing paths among nodes can be changed or modified easily and which includes redundancy in case of individual node failures. The present invention meets these needs.

SUMMARY OF THE INVENTION

The present invention provides an apparatus for receiving at least one packet of signals from a node included a collection of nodes and for providing at least one respective packet of signals to another node included in the collection, wherein the respective received and provided packets of signals include respective routing signals for respectively routing the respective received and provided signals among the nodes in the collection. The apparatus includes a receiver for receiving first signals modulated with respective packets of signals. The packets of signals which modify the first signals include respective routing signals. The apparatus also includes electronic circuitry for modifying the respective routing signals included in at least one of the received packets and for providing at least one respective modified packet of signals including the modified routing signals. A transmitter is included for transmitting second signals modulated with the modified packet of signals. Finally, an antenna is included for capturing the first signals and for propagating the second signals over a relatively short prescribed distance.

In another aspect, the invention provides an apparatus for use with a collection of nodes and, furthermore, for use with credit cards or the like bearing electronically readable coding. The apparatus includes a receiver for receiving first signals modulated with respective packets of signals. The respective received packets include respective routing signals. Electronic circuitry is included for providing respective mapped signals. The respective mapped signals are respectively mapped to respective alternative routing signals which can be included in the respective received packets. A processor receives the respective routing signals included in at least one of the respective received packets, and receives from the electronic circuitry, mapped signals mapped to the routing signals included in at least one received packet. The processor is adapted to modify the routing signals included in at least one received packet by adding the mapped signals to the routing signals. The processor then can provide at least one modified packet of signals including the mapped signals. The apparatus also includes a transmitter for transmitting second signals modulated with the modified packet of signals. An antenna is included for capturing the first signals and for propagating the second signals over a relatively short prescribed distance. Circuitry is included for storing respective card coding signals included in at least one previously received packet. Finally, a cardreader is included for electronically identifying coding on received cards and for comparing the identified coding with the coding signals stored by the circuitry for storing.

In a still further aspect, the invention provides an apparatus for use in transferring packets of signals among a collection of nodes. The method comprises the steps of capturing first signals modulated with packets of signals, the modulating packets including routing signals and of receiving the first signals modulated with the respective packets. The method includes modifying respective routing signals included in at least one of the respective received packets and of providing at least one respective modified packet of signals including the respective modified routing signals. Furthermore, the method includes the steps of transmitting second signals modulated with at least one respective modified packet of signals and of propagating the second signals over a relatively short prescribed distance.

Moreover, in a still other aspect, the invention provides a local area network comprising a plurality of respective nodes located in spaced apart relation to each other. Each respective node includes a respective receiver for receiving respective first signals modulated with respective packets of signals, the respective received packets including respective routing signals for routing the received packets among the plurality of nodes. Each respective node also includes respective electronic circuitry for modifying respective routing signals included in at least one of the respective received packets and for providing at least one respective modified packet including the respective modified routing signals. Each respective node also includes a transmitter for transmitting respective second signals modulated with the at least one respective modified packet. Finally, each respective node includes an antenna for capturing the respective first signals and for propagating the respective second signals over a relatively short prescribed distance.

Thus, the present invention advantageously permits the relatively easy installation of local area networks even in relatively complex layouts in preexisting structures. Furthermore, the invention permits nodes of the network to be coupled so as to permit the flexible routing of packets of signals among nodes of the network. The flexibility permits routing to be easily modified and provides built in redundancy in case an individual node fails. Moreover, the invention permits relatively high throughput of packets of signals among the nodes.

These and other features and advantages of the present invention will become more apparent from the following detailed description of exemplary embodiments thereof, as illustrated in the accompanying drawings.

BRIEF DESCRIPTION OF THE DRAWINGS

The purpose and advantages of the present invention will be apparent to those skilled in the art from the following detailed description in conjunction with the appended drawings in which:

FIG. 1 shows a collection of nodes in a network and the coupling between the nodes in accordance with the invention;

FIG. 3 shows details of an antenna assembly of the node of FIG. 2;

DESCRIPTION OF THE PREFERRED EMBODIMENT

Figure 2:
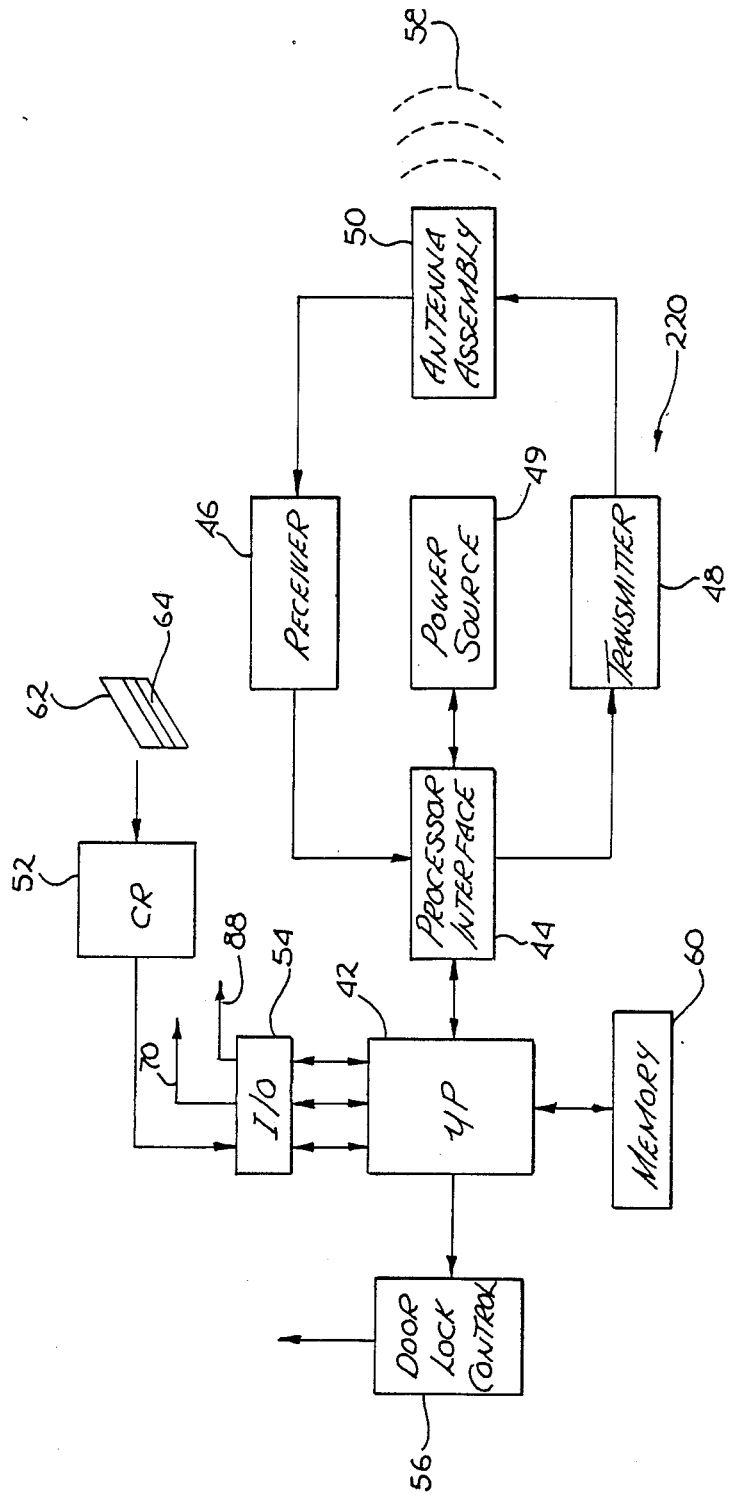
FIG. 2 shows a respective node of the network of FIG. 1.

The present invention comprises a novel apparatus and associated method for receiving packets of electronic signals from a node included in a collection of nodes and for providing the packets to other nodes within the collection. The invention further comprises a related novel local area network comprising the apparatus of the invention. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Referring to the illustrative drawings of FIG. 1 there is shown an exemplary collection of nodes 201-250 included in an exemplary local area network 38 in accordance with the principles of the present invention. Respective packets of electronic signals are routed respectively among the nodes 201-250 in the network 38 from node to node, until they reach respective destination nodes. The respective destination nodes then, for example, process the respective packets.

It will be noted that respective nodes 218, 220, 222, 232 and 242 are located at the centers of respective circular regions defined by circles 218′, 220′, 222′, 232′ and 242′. As will be explained more fully below, the respective circles define a prescribed substantially radial distance from their respective central nodes. Nodes located within a respective circle are neighboring nodes of the respective central node of that circle, and nodes located outside a respective circle are remote nodes with respect to the respective central node. For example, nodes 218, 219, 221, 222, 231, 232, 241 and 242 are neighboring nodes with respect to central node 220, and nodes 201-217, 223-230, 233-240 and 243-250 are remote nodes with respect to node 220. It should be understood that the prescribed distances defined by the illustrated circles 218', 220', 222', 232' and 242' are equal, and that although circles are illustrated for only five nodes, each of the fifty nodes 201-250 (only some of which are shown) is at the center of a respective circle defining the same prescribed distance. Thus, each of the fifty nodes 201-250 has neighboring nodes and remote nodes.

The local area network 38 of the present embodiment shown in FIG. 1 comprises a collection of nodes 201-250 which respectively function to control the locking and unlocking of respective electrified locks in response to electronically readable signals provided on credit cards. However, it will be appreciated that the principles of the invention apply regardless of the functionality of the respective nodes 201-250 in the network 38. For example, the nodes 201-250 alternatively could function to control machinery used on an automated assembly line in a factory.

The illustrative block diagram of FIG. 2 illustrates components of node 220 which is representative of the other nodes in the network 38. Node 220 includes a microprocessor 42 coupled through processor interface 44 to a receiver 46 and to a transmitter 48 and to a power source 49. In the preferred embodiment, the microprocessor 42 comprises a G.T.E. Telecommunications Processor G65SC151 Tempe, Ariz. The transmitter 48 and receiver 46 in turn are coupled to an antenna assembly 50 which is described below. The transmitter 48 and receiver 46 are respectively tuned, in the preferred embodiment, to transmit and receive frequency modulated signals having frequencies in the range of 160-200 kHZ. The node 220 receives input data signals from a cardreader 52 which is coupled through input/output terminals 54 to the microprocessor 42. The node 220 provides output control signals to a door lock control 56 which is coupled to the microprocessor 42 for controlling the locking and unlocking of a electrified door lock (not shown).

The antenna assembly 50 can capture a magnetic flux field 58 produced by a like antenna assembly of another node in the network 38. The captured field 58 may comprise frequency modulated signals modulated by information carrying packets of signals. Conversely, the antenna assembly 50 can provide a magnetic flux field 58 to be captured by a like antenna assembly of another node in the network 38. The produced field 58 also may comprise frequency modulated signals modulated by information carrying packets of signals.

It should be understood that although node 220 is illustrated and described as receiving input data signals from a cardreader 52 and as providing output control signals to a door lock control 56, alternative embodiments of the node 220 can receive respective input signals from and provide respective output control signals to other types of respective components. For example, in one alternative embodiment (not shown), a similar node can receive input data signals from a temperature sensor and can provide output control signals to an air conditioning and heating control unit. In another alternative embodiment (not shown), for example, a similar node can receive input data signals from a light sensor and motion detector unit and can provide output control signals to a lighting control unit. Therefore, it should be appreciated that a node constructed in accordance with the present invention can be modified to control a wide variety of functions depending upon the programming of its microprocessor and upon the nature of the input data signals received and upon the nature of the output control signals provided.

FIG. 3 provides an illustrative drawing showing details of the antenna assembly 50. The antenna assembly 50 includes a cylindrical ferrite rod 66 substantially enclosed within a conductor winding 68 and a tuning capacitor 75. The conductor winding 68 is coupled via line 70 to the receiver 46 and to the transmitter 48. It will be appreciated that, although the preferred embodiment includes an antenna assembly 50 including a ferrite core 66 and a conductor winding 68, other antenna types such as a simple dipole antenna will suffice provided that the transmitter 48 is adjusted to provide signals at a power level such that the distance over which the provided signals can be captured by like antennas and received by like receivers can be maintained sufficiently short and can be prescribed as described below.

Figures 4, 8:
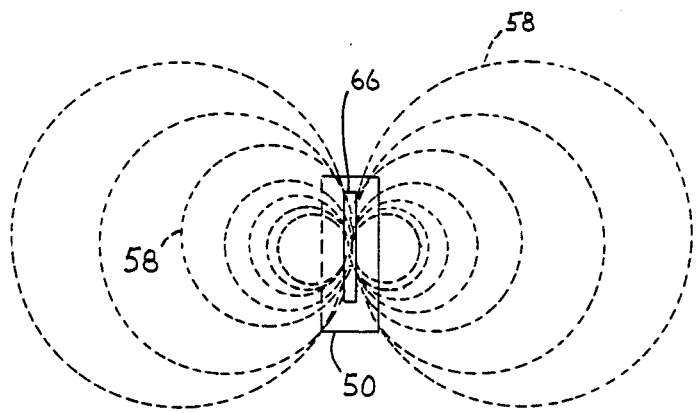
FIG. 4 shows a magnetic flux field propagated by the antenna assembly of FIG. 3.
FIG. 8 shows an exemplary routing map used by a microprocessor of the node of FIG. 2.

FIG. 4 provides an illustrative drawing of the magnetic flux field 58 produced by the antenna assembly 50 in response to signals transmitted by transmitter 48. The antenna assembly 50 produces a substantially torodial magnetic flux field 58. The intensity of the flux field 58 diminishes rapidly as distance from the rod 66 of the assembly 50 increases. The intensity of the magnetic flux field 58 decreases approximately in proportion to the inverse cube of the distance from the rod 66. Thus, for example, if the distance from the rod is doubled then the intensity of the magnetic flux field 58 produced by the antenna assembly 50 decreases by a factor of eight. As will be explained more fully below, this rapid decrease in the intensity of the magnetic flux field 58 is used to advantage in the present invention. Furthermore, the use of a magnetic flux field is particularly advantageous because it falls off relatively sharply, and, therefore, is particularly useful in defining a prescribed distance as explained below.

Moreover, it should be understood that the most sensitive orientation for the ferrite rod 66 of node 220 to capture magnetic flux produced by an antenna assembly of another node is for the rod 66 to be substantially parallel to the lines of flux provided by a ferrite rod of the antenna assembly of the other node. Thus, the antenna assembly 50 of node 220 is best positioned to capture a magnetic flux field produced by another node when a ferrite rod associated with the antenna assembly of the other node is oriented with its longitudinal axis parallel to the longitudinal access of the ferrite rod 66 of node 220, and such that the two ferrite rods are respectively substantially bisected by the same horizontal plane.

The receiver 46, using the antenna assembly 50, is adjusted such that it can effectively receive information carrying packets modulating signals in the magnetic flux field 58 only when the flux field 58 has an intensity above a prescribed level. Since the intensity of the magnetic flux field 58 decreases approximately with the inverse cube of distance from respective node, the ability of antenna 50 to capture a magnetic flux field 58 and of the receiver 46 to effectively receive a packet modulating signals in the field depends upon the spatial proximity of node 220 to the respective node in the network 38 producing the flux field 58.

FIG. 1 illustrates in an exemplary fashion the relationship between the arrangement of the nodes 201-250 in the network 38 and the ability of respective nodes to receive packets from and to transmit packets to other respective nodes. More particularly, assuming that the prescribed substantially radial distance respectively defined by circles 218', 220', 222', 232' and 242' defines the prescribed distance within which respective nodes 218, 220, 222, 232 and 242 can effectively transmit signals to and receive signals from other nodes in the network 38, then respective nodes 218, 220, 222, 232, and 242 can directly communicate packets only with their respective neighboring nodes and not with their respective remote nodes. In a presently preferred embodiment of the invention, the prescribed distance is approximately forty feet which is about double the typical distance between two doors in a hotel building. However, different prescribed distances can be used provided that a similar relationship is maintained between respective nodes and their respective neighboring and remote nodes. Moreover, as explained more fully below, the respective prescribed distances for different respective nodes in a network can be different.

Thus, the relatively short range of the respective packet modulated signals produced by the respective nodes of the network 38 is advantageously used, as will be explained more fully below, to form groupings of neighboring nodes which can communicate with each other, and to effectively isolate respective nodes from direct communication with their respective remote nodes. From the discussion which follows, it will be understood that this isolation of nodes into groupings increases the volume of information carrying packets which can be routed through the network 38. For example, nodes 223 and 234 can simultaneously transmit packets without interfering with each other because they are remote with respect to each other.

In operation, the antenna assembly 50 of node 220 captures a magnetic flux field 58 produced by any one of its neighboring nodes 218, 219, 221, 222, 231, 232, 241 or 242. The magnetic flux field 58 can include signals modulated by respective information carrying packets of signals which include routing signals for routing the packets among the collection of nodes 201-250.

For example, a respective packet may include routing signals identifying node 220 as a final destination node for the packet. Furthermore, the packet may include information signals which, when provided to the microprocessor 42, cause it to store, in memory element 60, card coding signals which correspond to a credit card owned by a person authorized to unlock a door (not shown) associated with the dead bolt lock (not shown) controlled by door lock control 56. Upon receiving the respective packet and identifying node 220 as the destination node, the microprocessor 42 produces a packet of signals which acknowledges the receipt by node 220 of the respective packet. The microprocessor 42 provides the acknowledgement packet via interface 44 to the transmitter 48 for transmission via antenna assembly 50 to the respective neighboring node, either 218, 219, 221, 222, 231, 232, 241 or 242 which sent the respective packet.

Subsequently, for example, the insertion of a credit card 62 bearing an electronically readable coding bar 64 into an appropriate slot (not shown) in the cardreader 52 causes the cardreader 52 to read the electronically readable code from the coding bar 64 and to provide code signals corresponding to the code via input/output terminals 54 to the microprocessor 42. The microprocessor 42 compares the code signals provided via terminals 54 with the card coding signals stored by memory element 60. If the microprocessor 42 finds a correspondence between the code signals and stored signals and if certain other criteria described below are met, then the microprocessor 42 causes the door lock control 56 to unlock the dead bolt lock (not shown).

If, on the other hand, no correspondence is found or some other criteria described below are not met then the microprocessor 42 will produce a packet of signals which represent an alarm signal and will provide that packet via processor interface 44 to the transmitter 48 for transmission via antenna assembly 50 to a neighboring node, 218, 219, 221, 222, 231, 241, 242 and ultimately to a central processor as will be explained below.

Figure 5:
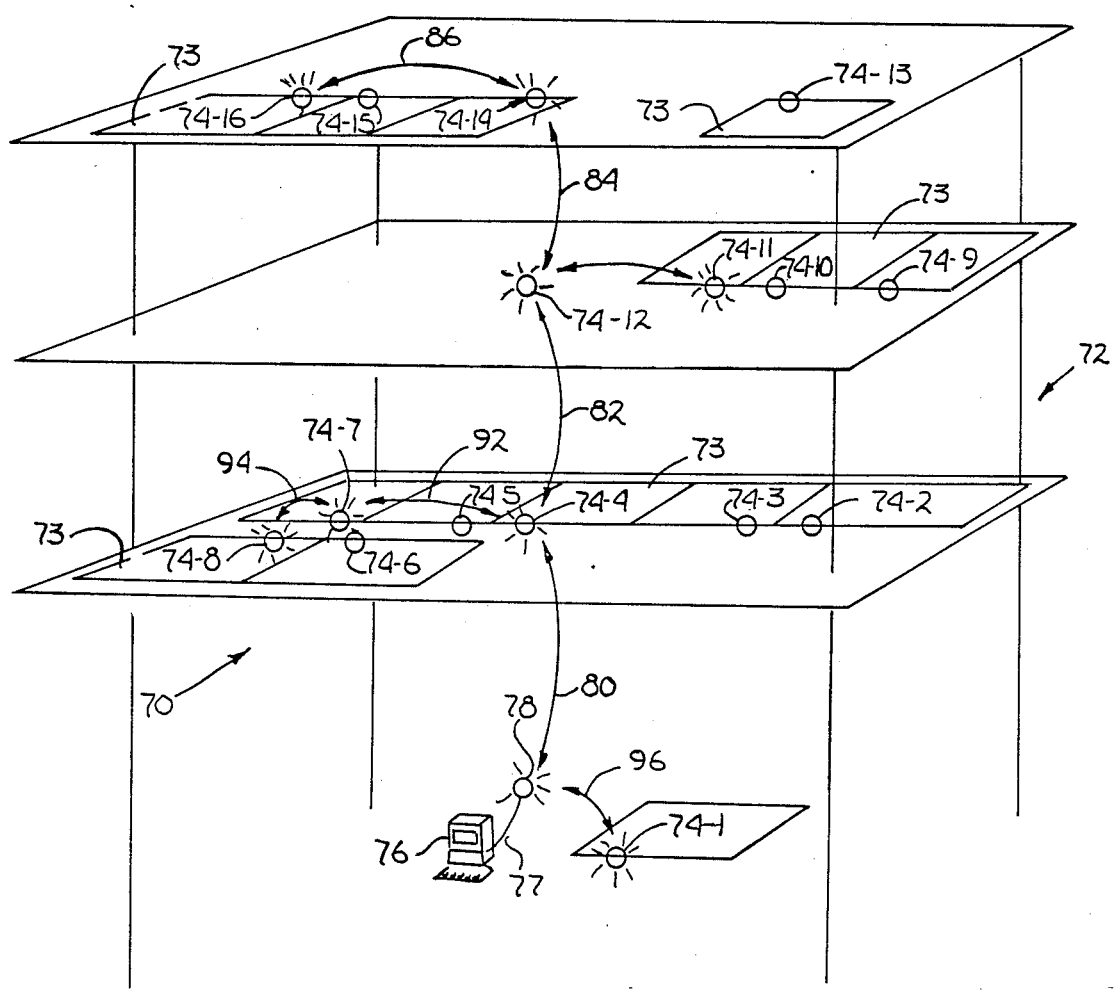
FIG. 5 shows a collection of nodes installed in a structure according to the present invention.

Referring now to FIG. 5, there is shown an illustrative drawing of a four story building 72 having a network of nodes 74-1-74-16 installed on different floors and at irregular locations throughout the different floors. The building 72, for example, can be a hotel building, and the rectangular regions 73 located on different floors of the building can represent rooms in the building. The nodes 74-1-74-16 are installed adjacent to respective hotel rooms and are used to control the locking and unlocking of dead bolt locks associated with doors leading to the rooms. The drawing also shows a control processor 76 for controlling the network of nodes 74-1-74-16. The control processor 76, for example, can be an IBM (trademark) compatible personal computer. The control processor 76 is coupled by line 77 to a network controller 78. The network controller 78 is merely a node similar to nodes 74-1-74-16 except that it lacks a cardreader and includes extra memory storage space for reasons explained below.

The collection of arrows labelled 80, 82, 84 and 86 depict an exemplary route taken by a respective packet of signals provided by the control processor 74 located on the ground floor to the network controller 78 for provision to node 74-16 located on the fourth floor. The route follows a path upward starting at the network controller 78 and then proceeding to node 74-4 and then to node 74-12 and then to node 74-14 and finally to node 74-16. Packets produced by node 74-16 for provision to the network controller 78 may follow a different path downward so as to avoid collisions with packets ascending to node 74-16 along the path just described from the network controller 78.

Referring once again to FIG. 2, the microprocessor 42 of exemplary node 220 exercises management and control over a variety of functions performed by the node. The functions can be divided into four categories: communications, card reading, monitoring, and command processing.

The communications function performed by exemplary node 220 (and by each of the nodes 201-250 illustrated in FIG. 1 and by each of the nodes 74-1-74-16 illustrated in FIG. 5), involves the management and control of the routing of packets from node to node. The communications function has two principle objectives. The first objective is to ensure that respective information carrying packets are transferred along a predetermined route from node to node among the nodes 201-250 in the network 38. The second objective is to monitor the integrity of the respective packets during the transfer, i.e. to detect errors.

The communications function includes the constituent functions of receiving and transmitting packets of signals. The microprocessor 42 periodically polls the processor interface 44 in order to determine whether the receiver 46 is currently receiving signals broadcasted by one or more of the neighboring nodes 218, 219, 221, 222, 231, 232, 241 or 242. If the microprocessor 42 determines that a neighboring node is broadcasting signals, then the microprocessor 42 examines respective packets modulating the received signals, as described below, to determine whether the packets are directed to node 220 or to another node in the network 38.

Conversely, when the microprocessor 42 determines that currently there are no signals broadcasted by neighboring nodes, then the microprocessor 42 checks an internal message buffer in order to determine whether there are packets of signals stored therein which are to be transmitted by node 220 to a neighboring node. If there are such packets in the internal message buffer, then the microprocessor 42 prepares to manage and control the transmission of the packets. If there are no such packets, then the microprocessor 42 monitors input/output lines 54 to determine whether a card read by cardreader 52 is in progress or whether there are alarm signals provided on respective lines 88 and 90, for example, due to a power failure or due to tampering with a door (not shown) associated with node 220.

It will be appreciated that, in the preferred embodiment, the card read function takes precedence over both the receive and transmit functions and that receive function takes precedence over the transmit function. Thus, the microprocessor 42 causes node 220 to respond to a card read by cardreader 52 before examining signals broadcast by a neighboring node; moreover, the microprocessor 42 will examine received signals before transmitting signals stored in the message buffer.

Figures 6, 7:
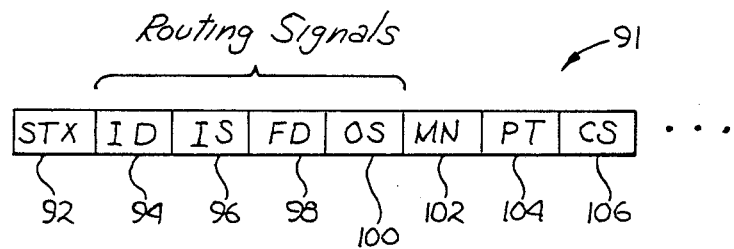
FIG. 6 shows a configuration of a packet of signals transferred among the nodes of FIGS. 1, 2 or 5.
FIG. 7 shows exemplary link tables used by a microprocessor of the node of FIG. 2.

The receiving function can best be understood by first referring to FIG. 6 which illustrates the configuration of signals in a respective representative packet 91 transferred among nodes 201-250. The representative packet 91 in FIG. 6 includes start text signals shown within box 92, initial destination signals in box 94, initial source signals in box 96, final destination signals in box 98, original source signals in box 100, message number signals in box 102, packet type signals in box 104 and checksum signals in box 106. The three dots to the right of the checksum signals in box 106 indicate that different respective packets may include different respective additional signals depending upon the packet type.

The initial destination signals, initial source signals, final destination signals and original source signals in respective boxes 94, 96, 98 and 100 represent routing signals which define a path followed by the respective representative packet of signals 91 in proceeding from node to node among the nodes in the network 38. Each signal type in the routing signals identifies a node in the network 38. The original source signals identify the respective node which originally produced the packet 91. (In the case of packets transferred among the nodes shown in FIG. 5, the original source also could be the network controller 78 which can produce packets in response to signals provided by the control processor 76). Final destination signals identify a node which is the ultimate destination or target for the packet 91. (In the case of the nodes shown in FIG. 5, the final destination also could be the network controller 78 which can receive signals to be provided to the control processor 76). The intermediate source signals identify an individual node which most recently broadcasted the packet 91. The intermediate destination signals identify the node which is to be the next node to receive the packet 91.

The remaining signals in the representative packet 91 perform the following functions. The start text signals identify the beginning of the packet 91. The message number signals identify a message number used to maintain a record of packet transfers between nodes identified by the intermediate source signals and the intermediate destination signals as explained below. The packet type signals identify the type of packet 91 so that the microprocessor 42 can determine what steps to take to process the packet 91. The checksum signals are used for error detection as will be appreciated by the those skilled in the art. The nature of possible additional signals, indicated by the three does, which can be included in the packet 91 (if there are in fact any more signals) depend upon the packet type and will be explained in more detail below. The possible additional signals, for example, can include data signals to be stored by the memory element 60 or command signals for directing the microprocessor 42 to control certain functions.

Referring once again to node 220, for example, upon detecting the broadcast of signals by a neighboring node, the microprocessor 42 causes the execution of procedure by which intermediate destination signals of a respective packet modulating the broadcasted signals are examined. Each node in the network 38, including node 220, is associated with a different respective identifying combination of signals used to identify the respective node. If there is a correspondence between the intermediate destination signals in a received packet and the respective identifying combination of signals corresponding to node 220, then the microprocessor 42 manages and controls a procedure by which the received packet is entered into the internal message buffer of the microprocessor 42 for processing. If, on the other hand, there is no such correspondence, then the microprocessor 42 does not enter the packet into the message buffer, and the respective received packet is ignored.

The steps in a procedure controlled by the microprocessor 42 by which respective packets entered into the internal message buffer are processed proceed essentially as follows. After the intermediate destination signals have been found to correspond with the respective identifying combinations of signals corresponding to node 220, and the packet has been entered into the internal message buffer, the checksum signals are checked and compared with a checksum generated using signals in the received packet in order to ascertain whether there is an error in the packet. The method by which the checksum signals are used to detect errors will be understood by those skilled in the art. If an error is detected, then the received packet is eliminated from the internal message buffer and ignored. If no error is detected, then the microprocessor 42 proceeds with the next step in the processing of the received packet.

After determining that no errors have been detected in the received packet, the next step in the procedure for processing the packet is to examine the intermediate source signals in the received packet to determine which neighboring node broadcasted the signals to node 220. More specifically, the microprocessor 42 compares the intermediate source signals to identifying combinations of signals stored in memory element 60 in order to determine which neighboring node most recently broadcasted the received packet.

After identifying the intermediate source of the received packet, the microprocessor 24 examines a family of link tables stored by memory element 60 and illustrated in FIG. 7. The link tables are used to maintain a record of packet transfers between node 220 and its respective neighboring nodes. The record is maintained in the form of respective out message numbers (OMN) and respective in message numbers (IMN) associated with respective neighboring nodes. For each respective neighboring node which can serve as an intermediate source of or an intermediate destination for packets received by node 220, both an OMN and an IMN is maintained. The OMN for a respective neighboring node records the number of packets transmitted by node 220 to the respective neighboring node, and the IMN records the number of packets received by node 220 from the respective neighboring node. The respective OMNs and IMNs are useful in identifying situations where packets routed between node 220 and its respective neighboring nodes have been lost in the transfer. Thus, the OMNs and IMNs serve an error detecting function.

Referring now to FIG. 7, and particularly to link map no. 3, assuming that a neighboring node which broadcasted the received packet to node 220 was node 232, then by referring to link map no. 3 it can be seen that the IMN stored in link map no. 3 is two. This indicates that node 220 previously received two packets from node 232. The microprocessor 42 compares the IMN stored in link map no. 3 for neighboring node 232 to the message number signals in the received packet. If the message number signals in the received packet corresponds to a number one greater than the IMN stored in link map no. 3, then the received packet is the next packet in order received by node 220 from neighboring node 232. The microprocessor 42 then causes the IMN stored in link map no. 3 corresponding to neighboring node 232 to be incremented by one. The microprocessor 42 further causes the production of an acknowledgement packet of signals which is entered into the internal message buffer for broadcast by the transmitter 48 using the antenna 50.

More particularly, the acknowledged packet is formed using the configuration shown in FIG. 6. The acknowledged packet includes start text signals, intermediate destination signals which correspond to the identifying combination of signals for node 232, intermediate source signals which correspond to the identifying combination of signals for node 220, final destination signals which correspond to identifying combination of signals for node 232, original source signals which correspond to the identifying combination of signals for node 220, message number signals which correspond to the number three, packet type signals which correspond to an acknowledgement packet type and checksum signals formed using the signals in the acknowledgement packet.

If the message number in the received packet corresponds to a number which equals the IMN for node 232 in link map no. 3, however, then the microprocessor 42 determines that the packet has been previously received. The microprocessor 42 then controls the formation of an acknowledgement packet identical to that described above except that the message number signals correspond to the IMN already stored in link map no. 3 for node 232 at the time of the reception of the packet. Of course, the checksum signals also will be different.

In the event that the message number signals in the received packet correspond to a number which is neither one greater than the IMN stored in link map no. 3 for node 232 nor to a number equal to that IMN, then an error condition exists, and the microprocessor 42 controls the construction and transmission of an error reporting packet.

After controlling the production of an acknowledgement packet and providing the acknowledgement packet to the internal message buffer, the microprocessor 42 examines the final destination signals in the received packet to determine whether node 220 is the final destination for the received packet. The microprocessor 42 compares the final destination signals with the identifying combination of signals for node 220, and if there is a correspondence between them then the microprocessor 42 determines that node 220 is the final destination for the received packet. In the event that this determination is made, the microprocessor 42 then manages and controls the processing of the received packet as described below. In the event that the microprocessor 42 determines that node 220 is not the final destination for the received packet, then the microprocessor 42 manages and controls a procedure described below for modifying the routing signals in the received packet to prepare the received packet for retransmission to a neighboring node.

More particularly, in the event that node 220 is not the final destination for the received packet, the microprocessor 42 consults a routing map illustrated in FIG. 8 which is stored by memory element 60 in order to determine the identity of the neighboring node to which a packet of signals modified, as described below, is to be transferred. Referring to FIG. 8, the routing map provides a mapping from a final destination node identified in the received packet by the final destination signals to a link map illustrated in FIG. 7 which identifies the next intermediate destination node in the routing of the packet to its final destination.

More specifically, the routing map links respective ranges of final destination nodes to respective link maps which link the respective ranges of nodes to respective next intermediate destination nodes and which maintain respective OMNs and IMNs for the respective next intermediate destination nodes. Moreover, the routing map includes multiple entries for certain of the ranges of final destinations in order to provide redundancy as explained more fully below. The routing map is used by first selecting the uppermost entry in the map which encompasses the final destination node in its range of nodes. For example, if the final destination of the packet described above received by node 220 from intermediate source node 232 is node 248 then the first routing map entry (reading down from the top of the rotating map) which includes the range as 242-250 is used to identify link map no. 4 as the link map identifying the next intermediate destination node for the packet.

After the microprocessor 42 has controlled the identification of the final destination node as node 248 and has controlled the referencing to the routing tables to determine that link map no. 4 identifies the next intermediate destination node, the microprocessor 42 controls the deletion of the intermediate destination signals currently in the packet and the addition to the packet of new intermediate destination signals corresponding to node 242 which is identified in link map no. 4 as the primary intermediate destination node. Additionally, the microprocessor 42 controls the modification of the intermediate source signals currently in the packet by deleting the current intermediate source signals and adding new intermediate source signals corresponding to node 220. Also, the microprocessor 42 identifies the OMN stored in link map no. 4 for node 242, increments it and substitutes this number which, in FIG. 7, is the number (seven plus one which equals) eight for the message number currently in the received packet. The number seven stored in link map no. 4 for node 242 indicates that there have been seven previous packets transmitted by node 220 to 242. Thus, a modified packet is formed which includes modified routing signals. It should be noted that at this point, the OMN stored in link map no. 4 for node 242 is left unchanged (the number seven is maintained).

Subsequently, the microprocessor 42 controls a procedure for transmitting the modified packet of signals to a neighboring intermediate destination node. The procedure includes entering the modified packet into the internal message buffer. The microprocessor 42 then prepares to transmit the modified packet. Before transmitting, however, the microprocessor 42 first monitors the processor interface 44 to determine whether a neighboring node currently is transmitting. If a neighboring node currently is transmitting, then the microprocessor 42 first examines any packets provided by the neighboring node and, if necessary, causes an acknowledgement packet to be sent. If no neighboring node currently is transmitting or after transmitting an acknowledgement packet the microprocessor 42 causes the transmitter 48 to transmit signals modulated by the modified packet. The microprocessor 42 then waits for a prescribed period of time for an acknowledgement signal from intermediate destination node 242. If an acknowledgement signal is not received within that prescribed period of time, then the microprocessor 42 causes the transmitter 48 to repeat the transmission sequence above. This sequence repeats for a prescribed number of retransmissions, usually three tries, or until an acknowledgment signal is received. Upon the reception of an acknowledgement packet from intermediate destination node 242, the microprocessor 42 causes link map no. 4 stored by memory element 60 to increment the OMN for node 242 by one (in this case, to increment from seven to eight).

In the event that no acknowledgement signal is received rom intermediate destination node 242 after the prescribed number of retransmissions, the microprocessor 42 once again refers to the routing map and identifies the next entry (reading from the top down in the routing map which includes the final destination node 258 in its range. The microprocessor 42 identifies the link map number in that next entry, in this case link map no. 8. The microprocessor 42 then consults the identified link map in order to identify an alternative intermediate destination node, which in this case is node 241.

The microprocessor 42 remodifies the modified packet by deleting the intermediate destination signals corresponding to intermediate destination node 242 and by substituting in their place intermediate destination signals corresponding to neighboring node 241. Furthermore, the microprocessor 42 substitutes the OMN in link map no. 8 corresponding to neighboring node 241 for the message number (seven) currently included in the modified packet. Referring to FIG. 7, the OMN in link map no. 8 corresponding to node 241 is three. Thus, the message number signals substituted into the modified packet correspond to the number three.

The microprocessor 42 then causes the remodified packet of signals to be substituted into the internal message buffer. The microprocessor 42 transmits the remodified signals following the procedures set forth above. If the microprocessor 42 does not receive an acknowledgement signal from node 241 after the prescribed number of retransmissions, then an error condition exists, and the microprocessor 42 controls the production of a packet of signals for transmission to report the error condition.

The provision of alternative intermediate destination nodes for certain ranges of final destinations provides redundancy to the packet transmission procedure. If the primary intermediate destination node fails, then an alternative intermediate destination node can be utilized instead. Thus, the network 38 of FIG. 1 automatically compensates for failed individual nodes.

Furthermore, the respective microprocessors of the respective neighboring nodes of node 220 each are configured such that the prescribed period of time between attempted transmissions of a modified packet is different for each neighboring node. This substantially prevents unwanted situations in which two or more neighboring nodes repeatedly attempt to simultaneously transmit signals.

As mentioned above, the microprocessor 42 of node 22 also controls the cardreading function. Briefly, the cardreader 52 reads the electronically readable code from the coding bar 64 on card 62 and provides corresponding code signals via input/output lines 54 to the microprocessor 42. The microprocessor 42, in turn, compares the code signals to card coding signals stored in an access control map stored by memory unit 60. The control map may include a plurality of entries. Each entry identifies the electronically readable code on a respective credit card which is authorized to be used to unlock a dead bolt lock (not shown) by inserting the credit card 62 into the cardreader 52. Furthermore, each entry includes the time frame within which the card is valid, and the days on which the card is valid. The microprocessor 42 includes circuitry to keep track of time. Thus, for example, a particular credit card may be valid only on certain days or only during certain times on certain days.

The microprocessor 42 also manages and controls a monitoring function. The monitoring function, in the preferred embodiment, includes two aspects. A first aspect involves the report of transactions involving card reader. A second aspect involves the monitoring of signals on lines 88 and 90 in order to detect and to record alarms due to, for example, a power failure or due to tampering with the door (not shown) associated with node 220.

In the course of managing and controlling the monitoring function, the microprocessor 42 controls the formation of respective packets of signals for each respective occurrence of a card read or of an alarm condition. The respective packets are stored in an internal transaction transmit buffer for transmission by the node 220 substantially according to the transmission procedure set forth above. The microprocessor 42 periodically checks its internal transaction transmit buffer in order to determine whether there are packets of signals awaiting transmission, and if there are, then it transmits substantially according to the procedures set forth above.

The packets transmitted from the internal transaction transmit buffer are routed to a control processor (not shown in FIG. 1). Referring to FIG. 5, for example, control processor 76 interfaces with nodes 74-1–74-16 through network controller 78 in order to receive packets from respective internal transaction transmit buffers. It will be appreciated that the network controller 78 may include extra memory space in order to handle possible high volumes of packets routed through it to and from the control processor 76.

Moreover, the microprocessor 42 also controls certain command functions. For example, an access control map update packet received from a neighboring node commands the microprocessor 42 to update entries in the access control map in order to change the authorized codes or times. Alternatively, for example, a memory upload request packet may command the microprocessor 42 to upload data into the memory unit 62 from a control processor. This packet type, for example, can be used to modify the routing tables or the link tables so as to change the routing structure of the network 38. Conversely, a memory download packet may command the microprocessor 42 to cause the formation of packets which essentially download the contents of memory element 60 to the control processor.

Thus, referring to the illustrative drawings of FIG. 5, it will be appreciated that the routing paths for packets of signals communicated among nodes 74-1–74-16 can be easily modified merely by using control processor 76 to produce upload request packets to be transmitted by network controller 78 which change the respective contents of the respective memory units of the nodes 74-1–74-16 so as to change the routing structure among the nodes. Therefore, the layout of the network can be changed, for example, when new rooms are added, without the need to go through extensive re-wiring or complicated procedures to couple the nodes of the network to one another.

Furthermore, it should be appreciated that the network of nodes in the building 72 is capable of a relatively high rate of throughput of packets because nodes which are remote to each other can simultaneously transmit signals. For example, referring to arrows 80, 92 and 94 which define a routing path from network controller 78, to node 74-5 to node 74-7 and finally to node 74-8 and referring to arrow 96 which defines a routing path between the network controller 78 and node 74-1 and referring to the routing path illustrated by arrows 80, 82, 84, and 86 discussed above, it will be appreciated that, provided that nodes 74-14, 74-7 and network controller 78 all are remote with respect to each other that each of these three nodes can simultaneously transmit without interfering with one another. Thus, it is possible that at least three different packets, following the three routes described above simultaneously can proceed through the network of nodes in the building 72. Thus, the network of nodes in building 72 can transfer packets in a bucket brigade fashion which permits relatively rapid and high volume throughput of packets.

Moreover, although in the embodiment of the local area network 38 illustrated in FIG. 1, the prescribed distances corresponding to the nodes 201-250 of the network all are equal, the principles of the invention apply as well where different nodes correspond to different prescribed distances. For example, referring to the block diagram of FIG. 2, the prescribed distance for node 22 can be increased by adjusting the receiver 46 to increase its sensitivity to weaker signals and by adjusting the transmitter 48 to increase the power level at which it transmits signals. Conversely, for example, the prescribed distance for node 22 can be decreased by adjusting the receiver 46 to decrease its sensitivity to weaker signals and by adjusting the transmitter 48 to decrease the power level at which it transmits signals.

The advantage to be gained from having different nodes in a network constructed in accordance with the present invention correspond to different prescribed distances can be exemplified by reference to FIG. 5. The illustrative drawings of FIG. 5 shows that the building 72 and the different rooms 73 in the building 72 are arranged such that node 74-12 which communicates packets with nodes 74-2–74-8 located on the second floor and which communicates packets with nodes 74-9–74-11 located on the third and which communicates packets with nodes 74-13–74-16 located on the fourth floor is located farther away from its respective neighboring nodes than are most other nodes in the buildings from their respective neighboring nodes. Therefore, node 74-12 must be adjusted so as to increase its corresponding prescribed distance. Consequently, node 74-12 is adjusted to receive weaker signals and to transmit at a higher power level.

It will be understood that the above described embodiment and methods are merely illustrative of many possible specific embodiments and methods which can represent the principles of the invention. Numerous and varied other arrangements and methods can be readily devised in accordance with these principles without departing from the spirit and scope of the invention. Thus, the foregoing description is not intended to limit the invention which is defined by the appended claims in which:

What is claimed is:

1. An apparatus for receiving at least one respective packet of signals from a node included in a collection of nodes and for providing at least one respective packet of signals to another node included in the collection, wherein the respective received and provided packets of signals include respective routing signals for respectively routing the respective received and provided packets among the nodes in the collection, said apparatus comprising:

first means for receiving first signals modulated with respective packets of signals, the respective received packets including respective routing signals;

second means for modifying respective routing signals included in at least one of the respective received packets and for providing at least one respective modified packet of signals including the respective modified routing signals;

third means for transmitting second signals modulated with the at least one respective modified packet of signals;

fourth means for capturing the first signals, for providing the first signals to said first means and for propagating the second signals provided by said third means over a relatively short prescribed distance;

data signal providing means for receiving data signals and for providing the data signals to said second means; and control signal providing means for providing control signals, said control signal providing means being responsive to said second means;

wherein said data signal providing means includes a card reader.

2. An apparatus for use with respective cards including electronically readable coding, said apparatus for receiving at least one respective packet of signals from a node included in a collection of nodes and for providing at least one respective packet of signals to another node included in the collection, wherein the respective received and provided packets of signals include respective routing signals for respectively routing the respective received and provided packets among the nodes in the collection, said apparatus comprising:

first means for receiving first signals modulated with respective packets of signals, the respective received packets including respective routing signals;

second means for providing respective mapped signals, the respective mapped signals being respectively mapped to respective alternative routing signals which can be included in the respective received packets;

third processor means for receiving respective routing signals included in at least one of the respective received packets, for receiving from said second means, respective mapped signals respectively mapped to the respective routing signals included in the at least one respective received packet, for modifying the respective routing signals included in the at least one respective received packet to add the respective mapped signals to the respective routing signals, and for providing at least one respective modified packet of signals including the respective mapped signals;

fourth means for transmitting second signals modulated with at least one respective modified packet of signals;

fifth means for capturing the first signals, for providing the first signals to said first means and for propagating second signals provided by said fourth means over a relatively short prescribed distance;

sixth means for storing respective card coding signals included in at least one other respective received packet; and seventh means for receiving respective cards, for respectively electronically identifying respective coding on the respective received cards and for comparing the identified coding with the coding signals stored by said sixth means.

3. The apparatus of claim 2 wherein said fifth means comprises an antenna including a conductor winding and a ferrite core substantially disposed within said winding.

4. A local area network comprising:
a plurality of respective nodes located in spaced apart relation to each other, each respective node including:
(1) respective first means for receiving respective first signals modulated with respective packets of signals, the respective received packets including respective routing signals for routing the received packets among said plurality of nodes;
(2) respective second means for modifying respective routing signals included in at least one of the respective received packets and for providing at least one respective modified packet including the respective modified routing signals;
(3) respective third means for transmitting respective second signals modulated with the at least one respective modified packet;

(4) respective fourth means for capturing the respective first signals, for providing the respective first signals to said respective first means and for propagating the respective second signals provided by said respective third means over a respective prescribed distance;
(5) data signal providing means for receiving data signals and for providing the data signals to said second means; and
(6) control signal providing means for providing control signals, said control signal providing means being respective to said second means;
wherein, for each respective node of said plurality of nodes, said data signal providing means includes a card reader.

5. A system for selectively controlling entry to a plurality of lockable rooms, each of said rooms having an entrance equipped with electromechanical locking means, said system comprising:
a central processor including means for generating access code information;
a local processor associated with each of said room entrances, said local processor having means for storing said access code information;
card reader means coupled to said local processor for reading a card encoded with data;
first transceiver means coupled to said central processor for transmitting a first signal modulated with packets of information including said access code information;
second transceiver means coupled to said local processor for receiving said first signal and for demodulating said packets of information including said access code information;
said local processor including means for comparing said access code information with said data encoded on said card and for selectively controlling said electromechanical locking means based upon a result of said comparison;
whereby said entrance is unlocked if portions of said data encoded on said card correspond to portions of said access code information.

6. The system of claim 5 wherein said second transceiver transmits a second signal modulated with said packets of information.

7. The system of claim 6 wherein said local processor modifies selected packets of said packets of information prior to modulation of said second signal.

8. The system of claim 7 wherein said selected packets of information comprise routing information.

9. The system of claim 8 wherein said local processor includes means for storing routing directions and said selected packets of information comprising routing information are modified in accordance with said routing directions.

10. The system of claim 5 wherein said local processor generates an acknowledgment packet following receipt of said first signal and said second transceiver transmits a third signal modulated with said acknowledgment packet.

11. The system of claim 5 wherein said electromechanical locking means comprises a dead bolt lock.

12. The system of claim 5 wherein said first signal comprises a magnetic flux field.

13. The system of claim 6 wherein said second signal comprises a magnetic flux field.

14. A method for selectively controlling entry to a plurality of lockable rooms, each of said rooms having an entrance equipped with electromechanical locking means, said method comprising the steps of:
- (a) providing each of said room entrances with local processor means;
- (b) providing each of said room entrances with card reader means coupled to said local processor means;
- (c) providing each of said room entrances with transceiver means coupled to said local processor means;
- (d) generating access code information;
- (e) sending said access code information to said transceiver means.
- (f) storing said access code information to said local processor means;
- (g) reading data encoded on a card inserted in said card reader means;
- (h) comparing said data encoded on said card with said stored access code information;
- (i) actuating said electromechanical locking means if said comparison results in a match, thereby allowing entry, and not actuating said electromechanical locking means if said comparison does not result in a match, thereby denying entry.

15. The method of claim 14 comprising the following steps in place of step (e):
- (e1) generating routing information; and
- (e2) sending said access code and routing information to said transceiver means.

16. The method of claim 15 comprising the following steps in place of step (f):
- (f1) storing said access code information in said local processor means if said routing information designates said local processor as a final destination; and
- (f2) modifying said routing information if said routing information does not designate said local processor as a final destination and sending said access code and modified routing information to another of said transceiver means.

17. An apparatus for receiving a first signal packet from a first node included in a collection of nodes and for providing a modified signal packet to another node in said collection of nodes, said first and modified signal packets including respective routing signals, said apparatus comprising:
- (a) receiving means for receiving said first signal packet including first routing signals;
- (b) processor means for modifying said first routing signals in said first signal packet to designate a second node for receipt of said modified signal packet;
- (c) transmitting means for transmitting said modified signal packet;
- (d) said receiving means including means for receiving an acknowledgment packet from said second node;
- (e) said processor means including means for further modifying said routing signals to designate a third node for receipt of said further modified signal packet if said acknowledgement packet is not received within a predetermined period of time.

18. The apparatus of claim 17 wherein said first signal packet and each of said modified signal packets are modulated on a carrier signal.

19. The apparatus of claim 18 further comprising antenna means coupled to said receiving means and said transmitting means for capturing and propagating said carrier signal.

20. The apparatus of claim 19 wherein said carrier signal comprises a magnetic flux field.

21. The apparatus of claim 20 wherein said antenna means includes:
- a conductor winding; and
- a core of magnetically permeable material disposed substantially within said winding.

22. The apparatus of claim 21 wherein the magnetically permeable material comprises ferrite.

23. The apparatus of claim 20 wherein said antenna means produces a substantially torodial magnetic flux field.

24. The apparatus of claim 20 wherein said antenna means produces a magnetic flux field which decreases in intensity approximately in proportion to an inverse cube of distance from said antenna means.

25. The apparatus of claim 17 further comprising storage means coupled to said processor means for storage a routing map.

26. The apparatus of claim 25 wherein said routing signals include a final destination node identifier.

27. The apparatus of claim 26 wherein said second and third nodes are selected from said routing map as a function of said final destination node identifier.

28. The apparatus of claim 17 further comprising:
- data signal providing means for receiving data signals and for providing the data signals to said processor means; and
- control signal providing means for providing control signals, said control signal providing means being responsive to said processor means.

29. The apparatus of claim 28 wherein said data signal providing means includes a card reader.

30. The apparatus of claim 28 wherein the control signals are provided in response to the data signals.

31. A local area network comprising a plurality of communications nodes located in spaced apart relationship to each other, each of said nodes including:
- (a) receiving means for receiving a first signal modulated with signal packets, said packets including routing signals for routing said signal packets among said plurality of nodes;
- (b) processor means for modifying at least one of said received signal packets by modifying said routing signals to designate a next node for receipt of said modified signal packet;
- (c) transmitting means for transmitting a second signal modulated with said modified signal packet;
- (d) said receiving means including means for receiving an acknowledgment packet from said next node;
- (e) said processor means including means for further modifying said modified signal packet by further modifying said routing signals to designate an alternate node different from said next node for receipt of said further modified signal packet if said acknowledgment packet is not received within a predetermined period of time.

32. The local area network of claim 31 further comprising antenna means coupled to said receiving means and said transmitting means for capturing said first signal and for propagating said second signal.

33. The local area network of claim 32 wherein said first and second signals comprise a magnetic flux field.

34. The local area network of claim 33 wherein said antenna includes:
- a conductor winding; and a core of magnetically permeable material disposed substantially within said winding.

35. The local area network of claim 34 wherein the magnetically permeable material comprises ferrite.

36. The local area network of claim 33 wherein said antenna means produces a substantially torodial magnetic flux field.

37. The local area network of claim 33 wherein said antenna means produces a magnetic flux field which decreases in intensity approximately in proportion to an inverse cube of distance from said antenna means.

38. The local network of claim 31 further comprising storage means coupled to said processor means for storing a routing map.

39. The local area network of claim 38 wherein said routing signals include a final destination node identifier.

40. The area local network of claim 39 wherein said next and alternative nodes are selected from said routing map as a function of said final destination node identifier.

41. The local area network of claim 31 wherein each node of said plurality of nodes further includes:
 data signal providing means for receiving data signals and for providing the data signals to said processor means; and
 control signal providing means for providing control signals, said control signal providing means being responsive to said processor means.

42. The local area network of claim 41 wherein said data signal providing means includes a card reader.

43. The local area network of claim 41 wherein the control signals are provided in response to the data signals.

44. In a network of communications nodes, a method for communicating between nodes comprising the steps of:
 (a) receiving a signal packet at a first node in said network, said signal packet including routing signals;
 (b) modifying said routing signals to designate a second node for receipt of said modified signal packet;
 (c) transmitting said modified signal packet to said second node;
 (d) waiting for an acknowledgment packet from said second node;
 (e) generating message completion data if said acknowledgment packet is received within a predetermined time;
 (f) further modifying said routing signals to designate a third node for receipt of said further modified signal packet if said acknowledgment packet is not received within said predetermined time.

45. The method of claim 44 wherein said signal packet is modulated on a carrier signal.

46. The method of claim 45 wherein said carrier signal comprises a magnetic flux field.

47. The method of claim 44 further comprising the step of repeating steps (c) and (d) if said acknowledgment packet is not received within said predetermined time.

48. The method of claim 44 wherein said second and third nodes are selected from a routing map stored at said first node.

49. The method of claim 48 wherein said routing signals include a final destination identifier and said second and third nodes are selected as a function of said final destination identifier.

* * * * *

UNITED STATES PATENT AND TRADEMARK OFFICE
CERTIFICATE OF CORRECTION

PATENT NO. : 4,912,461
DATED : 3/27/90
INVENTOR(S) : Cenzano, Jr. et al.

It is certified that error in the above-identified patent and that said Letters Patent is hereby corrected as shown below:

| | | |
|---|---|---|
| col. 13, line 50 | delete "rom" | insert --from-- |
| col. 18, line 12 | delete "respective" | insert --responsive-- |
| col. 19, line 14 | delete "to" | insert --in-- |
| col. 20, lines 18-19 | delete "storage" | insert --storing-- |
| col. 20, line 40 | after "said" | insert --signal-- |
| col. 20, line 66 | after "antenna" | insert --means-- |
| col. 21, line 19 | delete "alternative" | insert --alternate-- |

Signed and Sealed this

Fourteenth Day of January, 1992

*Attest:*

HARRY F. MANBECK, JR.

*Attesting Officer*   *Commissioner of Patents and Trademarks*